US 11,982,188 B2

(12) United States Patent
Cousseau et al.

(10) Patent No.: US 11,982,188 B2
(45) Date of Patent: May 14, 2024

(54) TURBOMACHINE ROTARY ASSEMBLY COMPRISING AN ANNULAR CLAMPING PART

(71) Applicant: SAFRAN AIRCRAFT ENGINES, Paris (FR)

(72) Inventors: Simon Jean-Marie Bernard Cousseau, Moissy-cramayel (FR); Nicolas Xavier Trappier, Moissy-Cramayel (FR); Maxime Aurelien Rotenberg, Moissy-cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/906,248

(22) PCT Filed: Mar. 19, 2021

(86) PCT No.: PCT/FR2021/050461
§ 371 (c)(1),
(2) Date: Sep. 13, 2022

(87) PCT Pub. No.: WO2021/186135
PCT Pub. Date: Sep. 23, 2021

(65) Prior Publication Data
US 2023/0125862 A1 Apr. 27, 2023

(30) Foreign Application Priority Data
Mar. 19, 2020 (FR) ........................ 2002695

(51) Int. Cl.
*F01D 11/12* (2006.01)
*F01D 9/04* (2006.01)
*F01D 11/02* (2006.01)

(52) U.S. Cl.
CPC ............ *F01D 11/122* (2013.01); *F01D 9/042* (2013.01); *F01D 11/02* (2013.01);
(Continued)

(58) Field of Classification Search
CPC ... F01D 9/02; F01D 9/04; F01D 9/041; F01D 9/042; F01D 11/001; F01D 11/02;
(Continued)

(56) References Cited

U.S. PATENT DOCUMENTS 3,398,931 A * 8/1968 Miller .................. F01D 11/005
415/217.1
3,733,146 A 5/1973 Smith et al.
(Continued)

FOREIGN PATENT DOCUMENTS

FR 2.132.655 11/1972
FR 2 620 598 A2 7/2013
(Continued)

OTHER PUBLICATIONS

FR3027343A1_MachineTranslation (Carlos, P.) Apr. 22, 2016. [retrieved on May 30, 2023] Retrieved from: Espacenet (Year: 2016).*
(Continued)

*Primary Examiner* — Elton K Wong
(74) *Attorney, Agent, or Firm* — Oblon, McClelland, Maier & Neustadt, L.L.P.

(57) ABSTRACT

A rotary assembly for a turbomachine including a rotor including at least two consecutive rotor stages provided with a plurality of blades and an annular rotor shroud connecting the two consecutive rotor stages, a stator including: at least one stator stage provided between the two consecutive rotor stages including a plurality of vanes, a turbomachine stator vane root, an annular clamping part and an annular support of abradable material, the root extending radially and being clamped axially between the annular support of abradable
(Continued)

material and the annular clamping part, A space separates a radially internal end of the root and the annular support of abradable material. A turbojet engine including a rotary assembly as previously.

11 Claims, 3 Drawing Sheets

(52) U.S. Cl.
CPC ...... *F05D 2220/32* (2013.01); *F05D 2240/11* (2013.01); *F05D 2240/12* (2013.01); *F05D 2240/24* (2013.01); *F05D 2240/55* (2013.01)

(58) Field of Classification Search
CPC ........ F01D 11/08; F01D 11/12; F01D 11/122; F05D 2220/32; F05D 2240/11; F05D 2240/12; F05D 2240/24; F05D 2240/55; F05D 2260/30
See application file for complete search history.

(56) References Cited

U.S. PATENT DOCUMENTS

| | | | | |
|---|---|---|---|---|
| 4,645,424 A | * | 2/1987 | Peters | ............... F01D 11/001 416/198 A |
| 4,869,640 A | | 9/1989 | Schwarz et al. | |
| 2013/0189086 A1 | | 7/2013 | Bayer et al. | |
| 2014/0105725 A1 | | 4/2014 | Stiehler | |
| 2015/0071768 A1 | | 3/2015 | Hugon et al. | |
| 2018/0340435 A1 | * | 11/2018 | Schlemmer | ........... F01D 25/246 |
| 2018/0355761 A1 | * | 12/2018 | Maar | .................... F01D 11/001 |

FOREIGN PATENT DOCUMENTS

| | | | | |
|---|---|---|---|---|
| FR | 2 988 787 A1 | | 10/2013 | |
| FR | 2 722 486 A1 | | 4/2014 | |
| FR | 3 027 343 A1 | | 4/2016 | |
| FR | 3027343 A1 | * | 4/2016 | ........... F01D 11/001 |

OTHER PUBLICATIONS

International Search Report dated May 31, 2021, in PCT/FR2021/050461 filed Mar. 19, 2021, 2 pages.

French Preliminary Search Report and Written Opinion dated Oct. 27, 2020, in French Application No. 2002695 filed Mar. 19, 2020, 8 pages.

* cited by examiner

TURBOMACHINE ROTARY ASSEMBLY COMPRISING AN ANNULAR CLAMPING PART

TECHNICAL FIELD

The present disclosure relates to a turbomachine assembly such as a turbine or a compressor, in which radial clearances are established in operation between the stator parts (fixed parts) fixed to the casing of the turbomachine and the rotor parts (moving parts) secured in rotation inside the casing. The present disclosure mainly focuses on the field of aircraft turbojet engines but can be applied more generally to any type of turbomachine.

PRIOR ART

In a turbomachine turbine, the rotor is driven by the air in the flowpath which expands at the level of the rotor blades, thereby yielding part of its energy thereto. However, it is frequently observed that part of the air in the flowpath, generally called "bypass", bypasses the inner and outer platforms of the blading and therefore does not expand at the level of the blading, which reduces the performance of the turbine.

In order to limit this inefficient air circulation which bypasses the blades, the heads of the blades of the rotor are generally equipped with wipers adapted to cut a track of abradable material carried by the stator, thus ensuring the sealing of the flowpath at the head of the blades. A similar device is provided for the vanes (or distributors): a shroud called "labyrinth" shroud is indeed provided between two blade wheels and carries wipers adapted to cut a track of abradable material carried by the root of the vanes, thus ensuring the sealing of the flowpath at the root of the vanes.

However, for this system to be effective, it is important to minimize the radial clearances separating the wipers from the abradable materials. However, a high and heterogeneous temperature prevailing in the turbine, phenomena of differential expansion of some elements may occur and modify the clearances between some parts, particularly between some parts made of different materials or located more or less in the vicinity of the air flowpath and therefore subjected to more or less high temperatures. For example, the radial displacement of the labyrinth shroud is lower than that of the vanes and particularly of the root: therefore, an increase in the clearance is observed separating the wipers carried by the labyrinth shroud from the abradable material carried by the root which expands differently from the abradable material. Thus, the bypass circulation increases and the turbine performance is reduced.

One disadvantage of the current turbines lies in the fact that the differential expansion appearing between the labyrinth shroud, or the annular support carrying the abradable material, and the members on which they are mounted— here the root—generates significant mechanical stresses at the interface between these parts, leading to their early damage and therefore to a reduction in their lifespan.

There is therefore a real need for a rotary assembly for a turbomachine which is devoid, at least partly, of the drawbacks inherent in the aforementioned known configurations.

DISCLOSURE OF THE INVENTION

The present disclosure relates to a rotary assembly for a turbomachine comprising a rotor including: at least two consecutive rotor stages provided with a plurality of blades and an annular rotor shroud connecting said two consecutive rotor stages, a stator including: at least one stator stage provided between said two consecutive rotor stages comprising a plurality of vanes, each comprising a turbomachine stator vane root, an annular clamping part and an annular support of abradable material, the root extending radially and being clamped axially between the annular support of abradable material and the annular clamping part, and in which a space radially separates a radially internal end of the root and the annular support of abradable material.

In the present disclosure, the axial direction corresponds to the direction of the axis of rotation A of the turbojet engine (or of the fan disk), and a radial direction is a direction perpendicular to the axis A. The azimuthal direction corresponds to the direction describing a ring around the axial direction. The three axial, radial and azimuthal directions correspond respectively to the directions defined by the side, the radius and the angle in a cylindrical coordinate system. Furthermore, the upstream and the downstream are defined with respect to the normal flow direction of the fluid (from upstream to downstream) through the turbojet engine.

In the present application, the upstream and the downstream are defined with respect to the normal flow direction of the fluid (from upstream to downstream) through the turbomachine. Furthermore, the axial direction corresponds to the direction of the axis of rotation A of the fan disk, and a radial direction is a direction perpendicular to the axis A. Finally, unless otherwise specified, the adjectives "interior" and "exterior" are used with reference to a radial direction such that the internal (i.e. radially internal) portion of an element is closer to the axis A than the external (i.e. radially external) portion of the same element.

Thus, the root can expand freely along the radial direction, taking advantage of the space that separates its radially internal end from the annular support of abradable material. Indeed, this clearance provided by the space allows both the free expansion of the root, but also the free expansion of the annular support of abradable material, which therefore allows radial self-adjustment of the expansion of the different elements of the stator stage. Consequently, the sealing between the two rotor stages is improved.

Also, since the space allows the free radial expansion of the root, the radial contact between the root and the annular support of abradable material is prevented, so that no radial stress is applied on the annular support of abradable material from the root. Thus, the lifespan of the parts of the stator stage is improved.

Furthermore, the use of a clamping part allows simple assembly of the annular support of abradable material on the root. In addition, the manufacture of such a clamping part is also simpler than the manufacture of the means for fixing the annular support of abradable material to the root known from the prior art, for example FR 3027343.

It should also be noted that the present disclosure focuses more particularly on low-pressure turbines, but that it can be applied to a high-pressure turbine or to a compressor.

In some embodiments, the clamping part is a ring distinct from the annular support of abradable material.

In this configuration, the manufacture of the clamping part is independent of the manufacture of the support of abradable material. Consequently, the manufacture of the clamping part is simplified.

In some configurations, the stator stage comprises a plurality of sectors, each sector comprising at least one vane extended by a root.

In some embodiments, the annular support of abradable material comprises an abradable portion which faces at least one wiper carried by the rotor shroud.

In this configuration, the sealing between the rotor stages is better than when the configuration is reversed, that is to say when the rotor shroud comprises an abradable portion and a support carried by the root comprises a wiper.

In some embodiments, the annular support of abradable material is made of ceramic matrix composite material.

This material is lighter than metal, resists heat better and also has a lower coefficient of expansion than metal. Consequently, the expansion of the annular support of abradable material is diminished.

In some embodiments, the root comprises a notch configured to cooperate by interlocking with a protrusion provided in the annular support of abradable material.

In this configuration, the tangential movements of the annular support of abradable material relative to the root are restricted. It should also be noted that this protrusion only restricts tangential movements: radial movements, particularly due to the expansion, are not limited.

In some embodiments, the annular support of abradable material comprises at least three protrusions distributed every 120° on the annular support of abradable material.

In this configuration, the support of abradable material is easily centered. Indeed, the entanglement of the annular support of abradable material in the root facilitates the positioning of the annular support of abradable material such that it is concentric with the root.

In some embodiments, the annular support of abradable material comprises a threaded portion and the clamping part is configured to be screwed onto the annular support of abradable material.

This configuration allows simply assembling the clamping part and the annular support of abradable material around the root.

In some embodiments, the clamping part and the annular support of abradable material are assembled around the root by shrink-fitting.

In some embodiments, the clamping part and the annular support of abradable material are assembled around the root by a weld.

The two previous configurations allow assembling the clamping part and the annular support of abradable material around the root in an alternative manner.

The present disclosure also relates to a turbojet engine comprising a rotary assembly according to any one of the preceding claims.

Such a turbojet engine has the advantages set out above.

BRIEF DESCRIPTION OF THE DRAWINGS

The invention and its advantages will be better understood upon reading the detailed description given below of different embodiments of the invention given by way of non-limiting examples. This description refers to the pages of the appended figures, on which.

DESCRIPTION OF THE EMBODIMENTS

Figure 1:
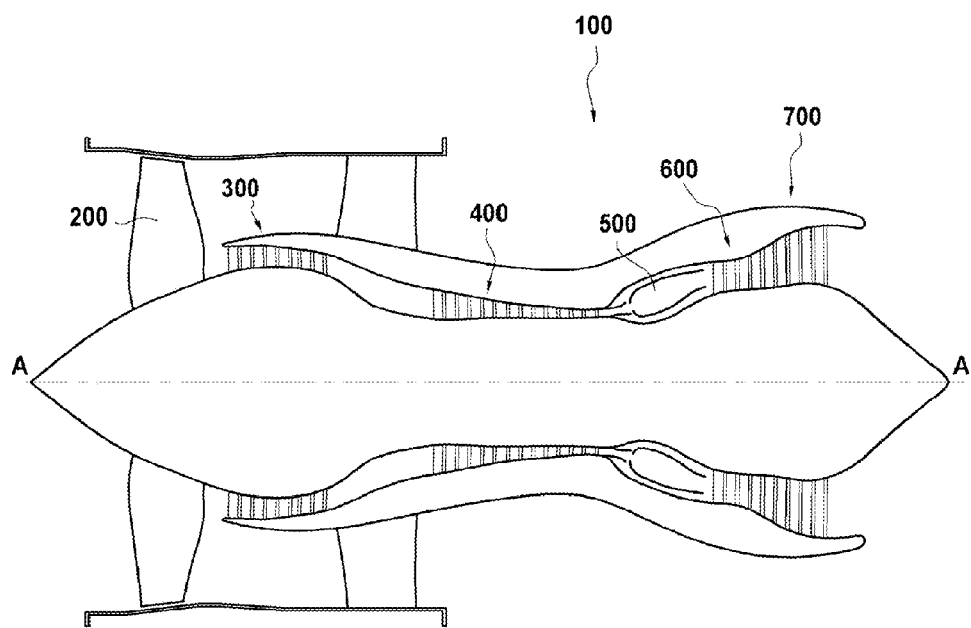
FIG. 1 represents a turbojet engine comprising a low-pressure turbine according to one embodiment.

FIG. 1 represents a sectional view along a vertical plane passing through the main axis A of a turbojet engine 100 according to the invention. The turbojet engine 100 comprises a fan 2, a low-pressure compressor 300, a high-pressure compressor 400, a combustion chamber 500, a high-pressure turbine 600 and a low-pressure turbine 700.

Figure 2:
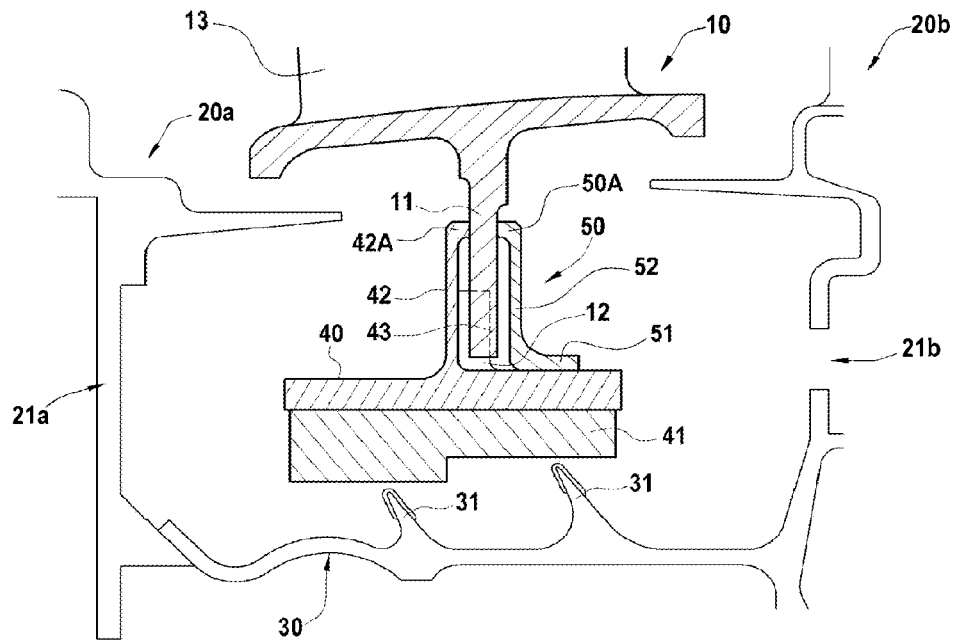
FIG. 2 represents a sectional view of the low-pressure turbine according to the embodiment.

FIG. 2 represents a sectional view along the same axial plane of part of the low-pressure turbine 700 according to one embodiment of the invention. The low-pressure turbine 700 comprises a plurality of rotor stages. FIG. 2 represents two successive rotor stages 20a, 20b surrounding a stator stage 10 from upstream to downstream, the rotor stages 20a and 20b being respectively upstream and downstream of the stator stage 10. Each of these rotor 20a, 20b and stator 10 stages comprises a plurality of blades and vanes, respectively.

Each rotor stage 20a, 20b comprises a respective distributor 21a, 21b on which the blades are disposed. The distributors 21a, 21b of two successive rotor stages are interconnected by a shroud 30 comprising a plurality of wipers 31.

The stator stage 10 comprises a plurality of sectors, each sector comprising one or several vanes 13 disposed on a stator vane root 11. The root 11 extends along the radial direction, and the set of the roots 11 of each sector of the stator stage 10 extends about the axis A of the turbojet engine 100. In other words, the set of the roots 11 extends in a plane perpendicular to the axis A.

The stator stage 10 also comprises an annular support of abradable material 40 which extends about the axis A, and extends axially downstream and upstream of the root 11. The annular support of abradable material 40 comprises an abradable portion 41 which is disposed facing the wipers 31 of the shroud 30. The wipers 31 are in contact with the annular support of abradable material 40 which hinders the passage of air at the level of the root 11 of the stator stage 10 Thus, the air preferably passes at the level of the blades 13 of the stator stage.

The abradable portion 41 is provided in a material whose structure is a honeycomb structure and which can for example be an aluminum alloy. This abradable portion is configured to wear on contact with the wipers 31 when using the turbojet engine 100.

The annular support of abradable material, for its part, is made of 3D woven ceramic matrix composite (CMC) material by a weaving method called "weaving contour". The "weaving contour" is a known technique for weaving a fibrous texture of axisymmetric shape in which the fibrous structure is woven on a mandrel with use of warp yarns, the mandrel having an external profile defined based on the profile of the texture fibrous to be made.

The shroud 30 can also be made of 3D woven CMC. This configuration is also advantageous because it allows ensuring that the shroud 30 and the annular support of abradable material 40 expand in the same way.

The annular support of abradable material 40 further comprises an arm 42 which extends along the radial direction. The arm 42 is located upstream of the root 11 and extends parallel thereto. The annular support of abradable material 40 also comprises a first clamping portion 42a which extends axially and is located at a radially external end of the arm 42. This clamping portion 42a is in axial contact with the root 11. In the present example, the contact with the root 11 takes place only axially, via the clamping portion 42a.

A clamping part 50 separate from the annular support of abradable material 40 is disposed downstream of the root 11 and comprises a body 52 which extends along the radial direction, parallel to the root 11 and to the arm 42. The clamping part 50 comprises a base 51 which extends axially and which is disposed at the radially internal end of the body 52. The base 51 of the clamping part 50 is in radial contact with the annular support of abradable material 40, on the downstream side of the root 11.

The clamping part 50 also comprises a second clamping portion 50a which is disposed at a radially external end of the body 52. The second clamping portion 50a is in axial contact with the root 11 and is disposed facing the first clamping portion 42a. The two clamping portions 42a, 50a produce an axial force on the root 11 in opposite directions, so that the root 11 is pinched axially between the annular support of abradable material 40 and the clamping part 50.

A space 12 radially separates the radially internal end of the root 11 and the annular support of abradable material 40. Indeed, the contact between the root 11 and the annular support of abradable material 40 is only axial. This space 12 is left over the entire circumference of the root 11 and of the annular support of abradable material 40.

Thus, the root 11 can expand radially in the space 12 under the effect of the temperature when the turbojet engine 100 is in operation without applying stresses on the annular support of abradable material 40.

Furthermore, the root 11 can also be separated axially from the arm 42 of the annular support of abradable material 40 and from the body 52 of the clamping part 50.

Figure 3:
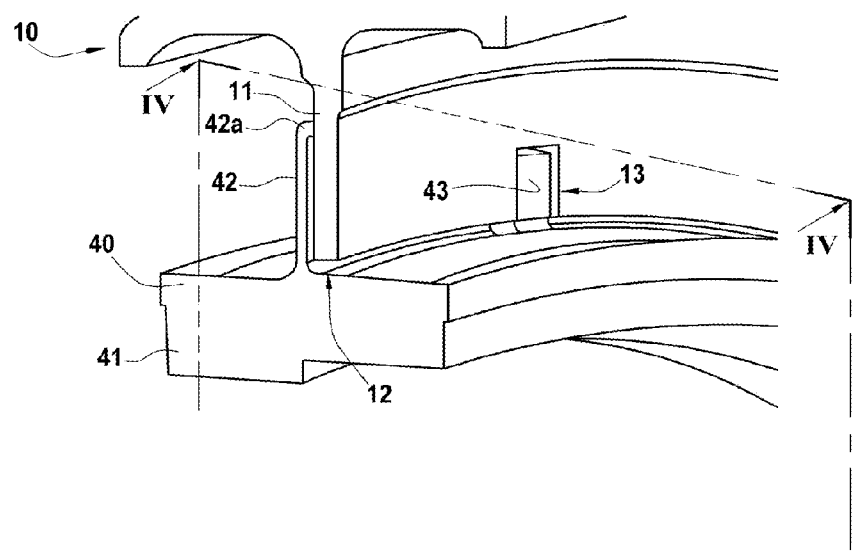
FIG. 3 represents a view centered on the root of a stator stage of the low-pressure turbine in which the clamping part is omitted.

As represented in FIGS. 2 and 3, the annular support of abradable material 40 can comprise a protrusion 43 oriented axially so as to penetrate axially into a notch 23 arranged in the root 11. For greater readability, the clamping part 50 has been omitted in FIG. 3. In the present example, the notch 23 extends over the entire axial width of the root 11 and is therefore a through-notch. The protrusion 43 can be in azimuthal contact with the root 11 on either side of its azimuthal ends.

The annular support of abradable material 40 can comprise a plurality of protrusions 43, distributed over its entire azimuthal dimension. Particularly, the annular support of abradable material 40 can comprise at least three protrusions 43 distributed every 120° around the annular support of abradable material 40, which allows greatly facilitating the centering of the annular support of abradable material 40 with the root 11. In this configuration, the root 11 comprises at least three notches 23 corresponding to these three protrusions 43.

Figure 4:
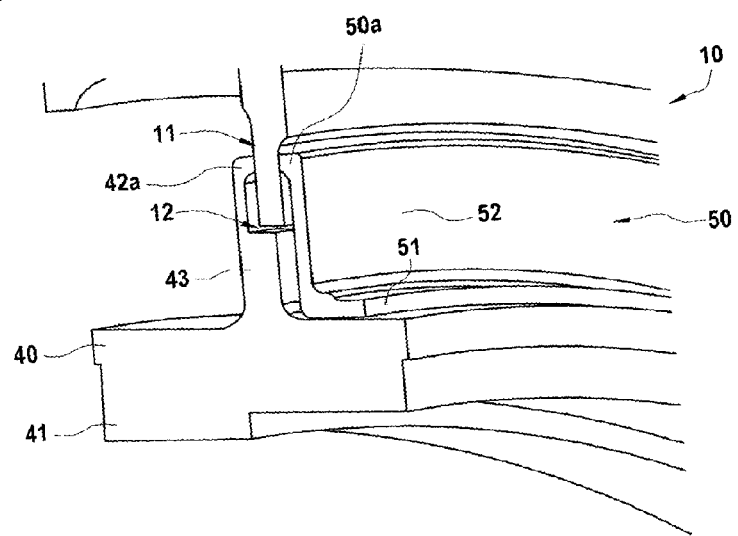
FIG. 4 corresponds to the view of FIG. 3 cut at the level of the plane IV.

FIG. 4 corresponds to the view of FIG. 3 cut at the plane IV, which is a plane along the radial and axial directions which intersects the annular support of abradable material 40 at the level of a protrusion 43. The space 12 radially separating the annular support of abradable material 40 and the root 11 is also present at the level of the protrusion 43. In other words, the space 12 radially separates the radially internal end of the root 11 and the radially external end of the protrusion 43.

The clamping part 50 and the annular support of abradable material 40 are mounted around the root 11 by shrink-fitting. However, in some configurations, the clamping part 50 can be welded or screwed onto the annular support of abradable material 40.

In the case where the annular support of abradable material 40 and the clamping part 50 are assembled around the root 11 by screwing, the annular support of abradable material 40 comprises a threaded portion configured to allow the screwing of the clamping part 50.

Although the present invention has been described with reference to specific exemplary embodiments, it is obvious that modifications and changes can be made to these examples without departing from the general scope of the invention as defined by the claims. Particularly, individual characteristics of the different illustrated/mentioned embodiments can be combined in additional embodiments. Consequently, the description and the drawings should be considered in an illustrative rather than restrictive sense.

It is also obvious that all the characteristics described with reference to one method can be transposed, alone or in combination, to one device, and conversely, all the characteristics described with reference to one device can be transposed, alone or in combination, to one method.

The invention claimed is:

1. A rotary assembly for a turbomachine, comprising:
   a rotor including:
      at least two consecutive rotor stages provided with a plurality of blades, and
      an annular rotor shroud connecting said two consecutive rotor stages,
   a stator including:
      at least one stator stage provided between said two consecutive rotor stages comprising:
         a plurality of vanes, each comprising a turbomachine stator vane root,
         an annular clamping part, and
         an annular support of abradable material,
         the root extending radially and being clamped axially between the annular support of abradable material and the annular clamping part,
   wherein a space radially separates a radially internal end of the root and the annular support of abradable material, and
   wherein the root comprises a notch configured to cooperate by interlocking with a protrusion provided in the annular support of abradable material.

2. The rotary assembly according to claim 1, wherein the clamping part is a circular ring distinct from the annular support of abradable material.

3. The rotary assembly according to claim 1, wherein the stator stage comprises a plurality of sectors, each sector comprising at least one vane extended by the root.

4. The rotary assembly according to claim 1, wherein the annular support of abradable material comprises an abradable portion which faces at least one wiper carried by the rotor shroud.

5. The rotary assembly according to claim 1, wherein the annular support of abradable material is made of ceramic matrix composite material.

6. The rotary assembly according to claim 1, wherein the root comprises a plurality of notches configured to cooperate by interlocking with a plurality of corresponding protrusions provided in the annular support of abradable material.

7. The rotary assembly according to claim 6, wherein the annular support of abradable material comprises at least three protrusions.

8. The rotary assembly according to claim 1, wherein the annular support of abradable material comprises a threaded portion and the clamping part is configured to be screwed onto the annular support of abradable material.

9. The rotary assembly according to claim 1, wherein the clamping part and the annular support of abradable material are assembled around the root by shrink-fitting.

10. The rotary assembly according to claim 1, wherein the clamping part and the annular support of abradable material are assembled around the root by a weld.

11. A turbojet engine comprising a rotary assembly according to claim 1.

* * * * *